(12) United States Patent
Jiang

(10) Patent No.: US 12,418,851 B2
(45) Date of Patent: Sep. 16, 2025

(54) INFORMATION SENDING METHOD AND RECEIVING METHOD, DEVICE AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 708 days.

(21) Appl. No.: 17/600,988

(22) PCT Filed: Apr. 1, 2019

(86) PCT No.: PCT/CN2019/080874
§ 371 (c)(1),
(2) Date: Oct. 1, 2021

(87) PCT Pub. No.: WO2020/199100
PCT Pub. Date: Oct. 8, 2020

(65) Prior Publication Data
US 2022/0167250 A1 May 26, 2022

(51) Int. Cl.
H04W 76/40 (2018.01)
H04W 4/20 (2018.01)
H04W 48/10 (2009.01)
H04W 48/12 (2009.01)
H04W 48/14 (2009.01)

(52) U.S. Cl.
CPC ............ H04W 48/10 (2013.01); H04W 4/20 (2013.01); H04W 48/12 (2013.01); H04W 48/14 (2013.01); H04W 76/40 (2018.02)

(58) Field of Classification Search
None
See application file for complete search history.

(56) References Cited

U.S. PATENT DOCUMENTS

2009/0316603 A1* 12/2009 Amerga ................ H04W 48/08
370/254
2011/0103338 A1* 5/2011 Astely .................. H04J 11/0069
370/329

(Continued)

FOREIGN PATENT DOCUMENTS

AU 2017311062 A1 2/2019
CN 107135502 A 9/2017

(Continued)

OTHER PUBLICATIONS

International Search Report and Written Opinion issued in PCT/CN2019/080874, dated Jan. 8, 2020, 8 pages.

(Continued)

Primary Examiner — Nicholas Sloms
(74) Attorney, Agent, or Firm — Arch & Lake LLP

(57) ABSTRACT

A method for sending information includes: determining, by a terminal, a first system information set scheduled by a first cell, wherein the first system information set comprises n pieces of system information, where n is a positive integer; and sending, by the terminal, first interest information to the first cell, wherein the first interest information indicates, within the first system information set, system information that the terminal is interested in and/or not interested in receiving.

15 Claims, 5 Drawing Sheets

(56) References Cited

U.S. PATENT DOCUMENTS

| | | | |
|---|---|---|---|
| 2016/0286555 A1* | 9/2016 | Papasakellariou | H04L 5/00 |
| 2017/0311285 A1* | 10/2017 | Ly | H04W 74/0833 |
| 2018/0199163 A1 | 7/2018 | Chen | |
| 2018/0220361 A1* | 8/2018 | Cheng | H04W 48/12 |
| 2019/0110244 A1* | 4/2019 | Shih | H04W 76/27 |
| 2019/0132170 A1* | 5/2019 | Si | H04L 5/0007 |
| 2019/0132824 A1* | 5/2019 | Jeon | H04L 5/00 |
| 2019/0174554 A1* | 6/2019 | Deenoo | H04W 72/0453 |
| 2019/0268922 A1 | 8/2019 | He et al. | |
| 2019/0289513 A1* | 9/2019 | Jeon | H04W 36/06 |
| 2019/0297597 A1* | 9/2019 | Zhao | H04W 4/20 |
| 2019/0306841 A1* | 10/2019 | Huang | H04L 5/0055 |
| 2019/0313428 A1* | 10/2019 | Zhou | H04L 27/2602 |
| 2020/0068477 A1* | 2/2020 | Awada | H04W 48/12 |
| 2020/0092873 A1* | 3/2020 | Tang | H04W 36/0083 |
| 2020/0120584 A1* | 4/2020 | Yi | H04L 5/0048 |
| 2021/0105704 A1* | 4/2021 | Xiao | H04W 48/12 |
| 2021/0136665 A1* | 5/2021 | Wu | H04W 8/24 |
| 2021/0289542 A1* | 9/2021 | Kim | H04W 48/14 |
| 2022/0015021 A1* | 1/2022 | Tao | H04W 36/32 |
| 2022/0124475 A1* | 4/2022 | Kang | H04W 72/20 |
| 2023/0139455 A1* | 5/2023 | Chatterjee | H04W 72/23 |
| | | | 370/329 |

FOREIGN PATENT DOCUMENTS

| | | |
|---|---|---|
| CN | 107371138 A | 11/2017 |
| CN | 107528678 A | 12/2017 |
| CN | 107708179 A | 2/2018 |
| CN | 108632766 A | 10/2018 |
| CN | 109479236 A | 3/2019 |
| WO | 2018012894 A1 | 1/2018 |
| WO | 2018082494 A1 | 5/2018 |
| WO | 2018084669 A1 | 5/2018 |
| WO | WO-2018228562 A1 * 12/2018 ........... H04L 5/0053 |

OTHER PUBLICATIONS

3GPP; Connected mode SI acquisition, (R2-1803365) Huawei, HiSilicon, Athens, Greece, Feb. 26-Mar. 2, 2018.

3GPP; SI Provision by dedicated signaling to Connected UEs, (R2-1808201) Huawei, HiSilicon, , Busan, Korea, May 21-25, 2018, 4 pages.

3GPP; SI Message TXRX in NR, (R2-1700012) Samsung, Jan. 17-19, 2017, 4 pages.

Chinese Office Action (including English translation) issued in CN201980000572.0, dated Feb. 19, 2021, 40 pages.

Extended European Search Report issued to EP Application No. 19922694.5 dated Mar. 21, 2022, (7p).

* cited by examiner

INFORMATION SENDING METHOD AND RECEIVING METHOD, DEVICE AND STORAGE MEDIUM

CROSS-REFERENCE TO RELATED APPLICATION

This application is the U.S. national phase application of PCT Application No. PCT/CN2019/080874, filed Apr. 1, 2019, the entire contents of which are incorporated herein by reference for all purposes.

TECHNICAL FIELD

Embodiments of the disclosure relate to the field of communication technologies, and in particular, to a method for sending information, a method for receiving information, a device, and a storage medium.

BACKGROUND

System information (SI) is generally used by a base station to inform a terminal of cell configuration, thereby enabling the terminal to learn how the cell corresponding to the base station is configured and, thus, to operate properly within a coverage of the cell. The SI includes a master information block (MIB) message and a system information block (SIB) message. Herein, the SIB message includes SIB 1 message, SIB 2 message, SIB 3 message and the like. Different SIB messages contain different configuration information.

In the related art, for the terminal in a connected state, the base station sends SI to the terminal in a broadcast manner, or sends SI to the terminal through dedicated signaling. However, when the terminal does not need to receive some SI, the base station still sends SI to the terminal, thereby increasing useless signaling overhead.

SUMMARY

Embodiment of the disclosure provide a method for sending information, a method for receiving information, a device, and a storage medium. Technical solution thereof is to be described as follows.

According to a first aspect of the disclosure, there is provided a method for sending information, including:
determining, by a terminal, a first system information set scheduled by a first cell, wherein the first system information set includes n pieces of system information, where n is a positive integer; and
sending, by the terminal, first interest information to the first cell, wherein the first interest information indicates, within the first system information set, system information that the terminal is interested in and/or not interested in receiving.

According to a second aspect of the disclosure, there is provided a method for receiving information, including:
sending, by a base station, a system information list to terminals within a cell, wherein the system information list indicates a first system information set scheduled by the base station, and the first system information set includes n pieces of system information, where n is positive integer; and
receiving, by the base station, first interest information sent by a target terminal within the cell, wherein the first interest information indicates, within the first system information set, system information that the target terminal is interested in and/or not interested in receiving.

According to a third aspect of the disclosure, there is provided an apparatus for sending information, being applied in a terminal and including:
an information set determining module, configured to determine a first system information set scheduled by a first cell, wherein the first system information set includes n pieces of system information, where n is a positive integer; and
an interest information sending module, configured to send first interest information to the first cell, wherein the first interest information indicates, within the first system information set, system information that the terminal is interested in and/or not interested in receiving.

According to a fourth aspect of the disclosure, there is provided an apparatus for receiving information, characterized in being applied in a base station and including:
an information list sending module, configured to send a system information list to terminals within a cell, wherein the system information list indicates a first system information set scheduled by the base station, and the first system information set includes n pieces of system information, where n is positive integer; and
an interest information receiving module, configured to receive first interest information sent by a target terminal within the cell, wherein the first interest information indicates, within the first system information set, system information that the target terminal is interested in and/or not interested in receiving.

According to a fifth aspect of the disclosure, there is provided a device for sending information, being applied in a terminal and including:
a processor; and
a memory configured to store instructions executable by the processor;
wherein the processor is configured to:
determine a first system information set scheduled by a first cell, wherein the first system information set includes n pieces of system information, where n is a positive integer; and
send first interest information to the first cell, wherein the first interest information indicates, within the first system information set, system information that the terminal is interested in and/or not interested in receiving.

According to a sixth aspect of the disclosure, there is provided a device for receiving information, being applied in a base station and including:
a processor; and
a memory configured to store instructions executable by the processor;
wherein the processor is configured to:
send a system information list to terminals within a cell, wherein the system information list indicates a first system information set scheduled by the base station, and the first system information set includes n pieces of system information, where n is positive integer; and
receive first interest information sent by a target terminal within the cell, wherein the first interest information indicates, within the first system information set, system information that the target terminal is interested in and/or not interested in receiving.

According to a seventh aspect of the disclosure, there is provided non-transitory computer-readable storage medium with a computer program stored thereon, wherein the computer program is used for, when being executed by a processor, implementing steps in the method according to the first aspect or steps in the method according to the second aspect.

It should be understood that the above general description and the following detailed description are only exemplary and explanatory, and cannot limit the disclosure.

BRIEF DESCRIPTION OF THE DRAWINGS

The drawings herein are incorporated into the specification and constitute a part of the specification, illustrate embodiments in accordance with the disclosure, and together with the specification are used to explain the principle of the disclosure.

DETAILED DESCRIPTION

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the disclosure. Rather, they are merely examples of devices and methods consistent with some aspects of the disclosure as detailed in the appended claims.

The network architecture and business scenarios described in the embodiments of the disclosure are intended to more clearly illustrate the technical solutions according to the embodiments of the disclosure, and do not constitute a limitation to the technical solutions according to the embodiments of the disclosure. Those of ordinary skill in the art will learn that, with development of the network architecture and emergence of new business scenarios, the technical solutions according to the embodiments of the disclosure are equally applicable to similar technical problems.

Figure 1:
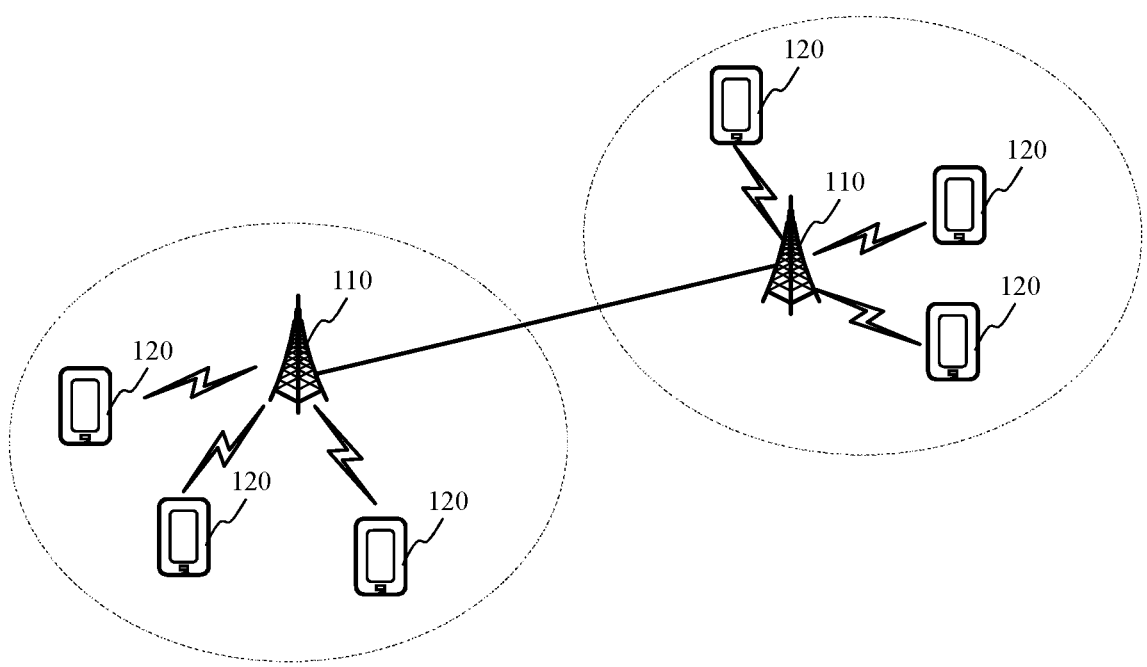
FIG. 1 is a schematic diagram showing a network architecture according to an exemplary embodiment.

FIG. 1 is a schematic diagram showing a network architecture according to an exemplary embodiment. The network architecture may include a base station 110 and a terminal 120.

The base station 110 is deployed in the access network. The access network in the 5G new radio (NR) system can be called new generation-radio access network (NG-RAN). The base station 110 and the terminal 120 communicate with each other through a certain air interface technology, for example, they communicate with each other through cellular technology.

The base station 110 is a device deployed in the access network to provide the terminal 120 with a wireless communication function. The base station 110 may include various forms of macro base stations, micro base stations, relay stations, access points, and so on. In systems using different wireless access technologies, the names of devices with base station functions may be different. For example, in the 5G NR system, they are called gNodeB or gNB. As communication technology evolves, the name "base station" may change. For ease of description, in the embodiments of the disclosure, the above-mentioned devices that provide wireless communication functions for the terminal 120 are collectively referred to as base stations.

The number of terminals 120 is usually multiple, and one or more terminals 120 may be distributed in a cell managed by each base station 110. The terminal 120 may include various handheld devices, vehicle-mounted devices, wearable devices, computing devices with wireless communication functions, or other processing devices connected to a wireless modem, as well as various forms of user equipment (UE), mobile stations (MS), terminal device and the like. For ease of description, in the embodiments of the disclosure, the above-mentioned devices are collectively referred to as terminals.

The "5G NR system" in the embodiments of the disclosure may also be referred to as a 5G system or an NR system, which can also be understood by those skilled in the art. The technical solutions described in the embodiments of the disclosure may be applicable to the 5G NR system, and may also be applicable to the subsequent evolution system of the 5G NR system.

Figure 2:
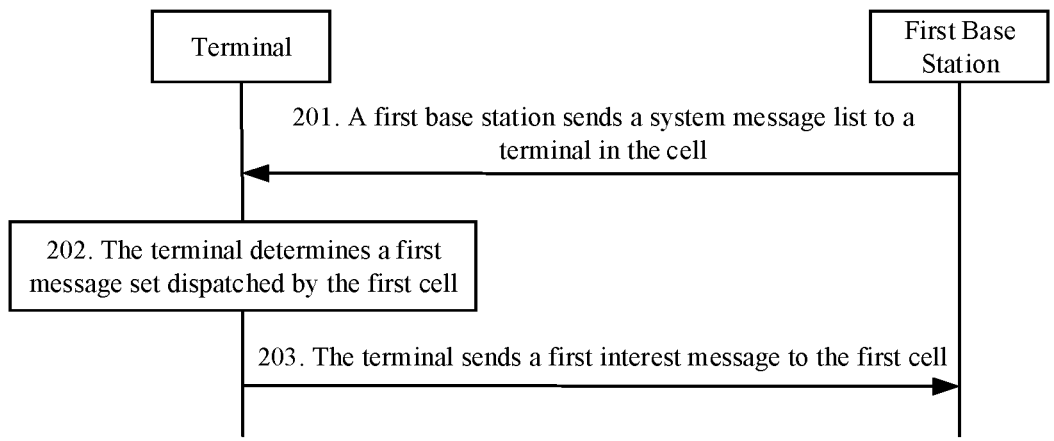
FIG. 2 is a flow chart showing a method for sending information according to an exemplary embodiment.

FIG. 2 is a flow chart showing a method for sending information according to an exemplary embodiment. This method can be applied to the network architecture shown in FIG. 1. The method can include the following steps (201-203).

In step 201, a first base station sends a system information list to terminals in the cell.

The above system information list indicates a first system information set scheduled by the first base station. The first system information set includes n pieces of system information, where n is a positive integer.

Based on the system information list, the terminal learns which system information can be provided to the terminal. The system information sets scheduled by different base stations may be the same or different. For example, a system information set scheduled by a base station includes SIB 1 message to SIB 13 message, and because another base station does not provide multimedia broadcast multicast service (MBMS), a system information set scheduled by the another base station may not contain SIB 13 message.

The above system information may indicate some basic features of the cell or network where the current base station is located and some common features of terminals within the cell. The terminal can obtain some basic characteristics of the current cell or network by receiving the system information sent by the base station. System information includes MIB messages and/or SIB messages, and SIB messages include SIB 1 message, SIB 2 message, SIB 3 message, and the like, which are not limited in the embodiments of the disclosure.

Optionally, the above system information list may be carried in information broadcast by the first base station, such as the SIB 1 message.

Optionally, the above system information list may be updated periodically. When the system information contained in the system information set in the system information list of the first base station changes, or the content of the system information changes, the system list needs to be updated.

In step 202, the terminal determines the first system information set scheduled by the first cell.

The first cell is the cell where the first base station is located. After receiving the system information list sent by the first base station, the terminal can determine the first system information set scheduled by the first cell (that is, the first base station) according to the system information list.

Optionally, the first system information set includes system information received in a connected state. The above system information received in the connected state may refer to the system information that the terminal may receive in the connected state, such as the system information that the terminal may need.

Further, the first system information set includes system information received in the connected state and allowed to be requested in an On-demand manner. The first system information set may include system information supporting transmission to the terminal in a broadcast manner, and may also include system information supporting the terminal to send a system information request to the first cell in the On-demand manner to request the first cell to send to the terminal.

In step 203, the terminal sends first interest information to the first cell.

After determining the first system information set scheduled by the first cell, the terminal can select the system information that the terminal is interested in receiving from the first system information set, and send the first interest information to the first cell (that is, the first base station). The foregoing first interest information indicates the system information that the terminal is interested and/or not interested in receiving in the first system information set.

For example, the first interest information indicates that the terminal is interested in receiving first system information, and/or is not interested in receiving second system information. Optionally, the foregoing first system information may be a certain system information in the first system information set, or may be multiple system information in the first system information set, which is not limited in the embodiments of the disclosure. Similarly, the foregoing second system information may be a certain system information in the first system information set, or may be multiple system information in the first system information set, which is not limited in the embodiments of the disclosure.

Optionally, the terminal may send the first interest information to the first cell in the following manner. The terminal sends radio resource control (RRC) signaling to the first cell, and the RRC signaling carries the foregoing first interest information. Alternatively, the terminal sends a media access control (MAC) control element (CE) signaling to the first cell, and the MAC CE signaling carries the foregoing first interest information. Alternatively, in some other embodiments, the terminal may also send the first interest information to the first cell through dedicated signaling, or may carry the first interest information in other signaling to be sent, which is not limited in the embodiments of the disclosure.

It should be noted that if the terminal is interested in receiving certain system information, the system information may be the system information currently required by the terminal or not the system information currently required by the terminal. Taking the first system information that the terminal is interested in receiving including SIB 8 messages as an example, assuming that the terminal does not currently obtain the SIB 8 message, but the terminal indicates that it is interested in SIB 8 message, which means that the terminal currently needs SIB 8 message. Assuming that currently the terminal has obtained SIB 8 message, if the terminal still wants to receive subsequent SIB 8 messages and SIB 8 messages with changed content, it means that the terminal is still interested in the SIB 8 message.

After the above-mentioned terminal sends the first interest information to the first cell, correspondingly, after the first base station receives the first interest information sent by the terminal, the first base station learns the system information that the terminal is interested and/or not interested in receiving, then the first base station may or may not send the system information that the terminal is interested in receiving.

Optionally, the first base station may send the system information that the terminal is interested in receiving in a broadcast manner, and may also send the system information that the terminal is interested in receiving through the dedicated signaling.

In summary, according to the technical solution provided by the embodiments of the disclosure, the base station sends the system information list to the terminal, thereby enabling the terminal to determine, from the system information list, the system information that it is interested and/or not interested in receiving. Subsequently, the terminal informs the base station of the system information that it is interested and/or not interested in receiving, thereby enabling the base station to send and/or not to send to the terminal the system information that it is interested in receiving. Compared with the related art in which the base station sends certain system information to the terminal even the terminal does not need to receive the system information, according to the disclosure, the base station sends the system information that the terminal is interested in receiving according to the interest information sent by the terminal, without sending system information that the terminal is not interested in receiving, thereby reducing useless signaling overhead.

Figure 3:
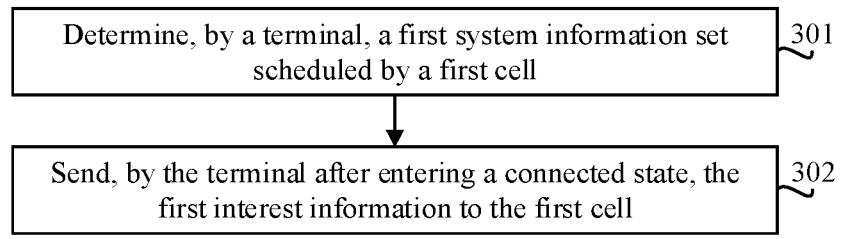
FIG. 3 is a flow chart showing a method for sending information according to another exemplary embodiment.

FIG. 3 is a flow chart showing a method for sending information according to another exemplary embodiment. This method can be applied to the terminal shown in FIG. 1. The method can include the following steps (301-302).

In step 301, the terminal determines the first system information set scheduled by the first cell.

The first system information set contains n pieces of system information, where n is a positive integer.

In step 302, after entering the connected state, the terminal sends first interest information to the first cell.

The foregoing first interest information indicates system information that the terminal is interested and/or not interested in receiving in the first system information set. Optionally, the system information that the terminal is interested and/or not interested in receiving may be one or more pieces of system information in the first system information set, which is not limited in the embodiments of the disclosure.

Further, the first interest information may include an identifier of the system information that the terminal is interested and/or not interested in receiving, so as to inform the base station which system information the terminal is interested and/or not interested in receiving.

The terminal enters the connected state and needs to establish a communication connection with the first cell. Establishing the communication connection between the terminal and the first cell may include following steps. The terminal sends a random access request to the first cell; the terminal receives connection indication information sent by the first cell according to the random access request, and the connection indication information indicates the terminal to enter the connected state; the terminal establishes the communication connection with the first cell. After that, the terminal may send the first interest information to the first cell through the established communication connection.

In some exemplary embodiments, the foregoing first interest information contains n bits, and the n bits correspond to the n pieces of system information in a one-to-one correspondence; wherein, an i-th bit of the n bits indicates whether the terminal is interested in receiving the i-th system information of the n pieces of system information, where i is a positive integer less than or equal to n.

Exemplarily, in conjunction with Table-1, assuming that the first system information set contains 3 pieces of system information, namely SIB 4 message, SIB 5 message, and SIB 6 message. The first interest information contains 3 bits, namely 1, 0 and 1, which correspond to the 3 pieces of system information one-to-one, that is, SIB 4 message corresponds to 1, SIB 5 message corresponds to 0, and SIB 6 message corresponds to 1. When the bit in the interest information is 1, it means that the terminal is interested in receiving the system information corresponding to this bit. When the bit in the interest information is 0, it means that the terminal is not interested in receiving the system information corresponding to this bit. Accordingly, the terminal is interested in receiving SIB 4 message and SIB 6 message, but not interested in receiving SIB 5 message.

TABLE 1

| First system information set | First interest information |
|---|---|
| SIB 4 Message | 1 |
| SIB 5 Message | 0 |
| SIB 6 Message | 1 |

The first interest information contains bits one-to-one corresponding to the system information. On the one hand, it can simply and clearly inform the base station of the system information that the terminal is interested and not interested in. On the other hand, through the bitmap manner, signaling load and power consumption of the terminal can be reduced. Optionally, the sequence of the n bits included in the first interest information is consistent with the sequence of the n pieces of system information scheduled by the system information list sent by the first base station.

Optionally, after sending the first interest information, the terminal expects to receive an acknowledgement message fed back by the first cell corresponding to the first interest information. If the terminal receives the acknowledgement message, it means that the first cell successfully receives the first interest information sent by the terminal. If the terminal does not receive the acknowledgement message, it means that the first cell has not successfully received the first interest information sent by the terminal, so the terminal can send the first interest information to the first cell again. Therefore, it can be ensured that the first cell successfully receives the first interest information sent by the terminal. In some other embodiments, after sending the first interest information, the terminal may not expect to receive the acknowledgement message corresponding to the first interest information fed back by the first cell, which is not limited in embodiments of the disclosure.

Optionally, if the terminal indicates to the first base station that it is interested in receiving the first system information through the first interest information, but the terminal does not receive the first system information sent by the first base station, the terminal may send a system information request (SI request) to the first base station, thereby requesting the first base station to send the first system information that the terminal is interested in receiving. The system information request may carry the identifier of the first system information that the terminal is interested in receiving.

Optionally, if the terminal changes whether it is interested in receiving system information in the first system information set, the terminal sends interest change information to the first cell, and the interest change information indicates the updated system information that the terminal is interested and/or no interested in receiving.

Exemplarily, assuming that the system information that the terminal is interested in receiving at first is SIB 4 message, and the system information that the terminal is not interested in receiving is SIB 6 message. Later, because the terminal needs to know the configuration parameters of the public and shared physical channels, the system information that the terminal is interested in receiving becomes SIB 6 message, and the system information that the terminal is not interested in receiving becomes SIB 4 message. Then, the terminal may inform the first cell of the system information that the terminal is interested and/or not interested in receiving after the change of interest through the above-mentioned interest change information. Optionally, the aforementioned interest change information includes n bits, and the n bits correspond to n pieces of system information one-to-one; wherein, the i-th bit of the n bits indicates whether the terminal is interested in receiving the i-th system information of the n pieces of system information, where i is a positive integer less than or equal to n.

In some other embodiments, the aforementioned interest change information can also directly indicate to the first cell the change of whether the terminal is interested in receiving the system information in the first system information set, and the interest change information can carry an identifier of the changed system information.

After the terminal changes whether it is interested in receiving the system information in the first system information set, the interest change information is sent to the cell, so that the base station can learn the current demand of the terminal, and further send system information for the demand to the terminal.

Optionally, the terminal receives an interest report request message sent by the first cell, and the interest report request message indicates the terminal to report system information that the terminal is interested and/or not interested in receiving. After receiving the interest report request message, the terminal sends first interest information to the first cell. That is, the first cell may request or instruct the terminal to report the system information that the terminal is interested and/or not interested in receiving, so that the first cell can determine the system information that the terminal is interested in and/or not interested in receiving.

Optionally, the terminal receives designated system information, and the designated system information includes interest report indication information, which indicates whether the network allows or supports the terminal to report system information that the terminal is interested and/or not interested in receiving. If the interest report indication information indicates that the network allows or supports the terminal to report the system information that the terminal is interested and/or not interested in receiving, the terminal sends the first interest information to the first cell. That is, the cell can indicate to the terminal whether the cell allows or supports the terminal to report system information that the terminal is interested and/or not interested in receiving. When the cell allows or supports the reporting, the terminal reports the system information that the terminal is interested and/or not interested in receiving. When the cell does not allow or support the reporting, the terminal does not report the system information that the terminal is interested and/or not interested in receiving.

In addition, the foregoing designated system information may be system information sent by the first cell in the broadcast manner, such as SIB 1 message. In some exemplary embodiments, the base station sends the designated system information along with the system information list to the terminals in the cell, for example, the designated system information is SIB 1 message, and the SIB 1 message carries the system information list. In some other exemplary embodiments, the base station sends the designated system information first, and then sends the system information list; or it may also send the system information list first, and then send the designated system information, which are not limited in the embodiments of the disclosure.

After the first cell receives the first interest information sent by the terminal, it can learn the system information that the terminal is interested in and/or not interested in receiving, then the first cell can determine to send the system information that the terminal is interested in receiving to the terminal. Accordingly, the terminal can receive the system information that it is interested in receiving.

Optionally, the terminal sends capability information to the first cell, where the capability information indicates whether the terminal has the ability to report system information that the terminal is interested and/or not interested in receiving. When the terminal has the ability to report system information that the terminal is interested and/or not interested in receiving, the terminal reports to the first cell the system information that the terminal is interested and/or not interested in receiving. When the terminal does not have the ability to report system information that the terminal is interested and/or not interested in receiving, the first cell cannot learn the system information that the terminal is interested in receiving. Accordingly, the base station can transmit preset system information by default.

It can be seen from the above that when the terminal has the ability to report the system information that the terminal is interested and/or not interested in receiving, the terminal can report to the cell the system information that the terminal is interested and/or not interested in receiving. Correspondingly, the cell can transmit the system information that the terminal is interested in receiving, and there is no need for the base station to transmit preset system information by default that the terminal is not necessarily interested, thereby improving transmission efficiency and reducing power consumption of the terminal.

Optionally, if the terminal switches from the first cell to a second cell, the terminal determines a second system information set scheduled by the second cell, and the second system information set includes at least one pieces of system information; and the terminal sends second interest information to the second cell, where the second interest information indicates the system information that the terminal is interested and/or not interested in receiving in the second system information set.

When the terminal moves from one cell to another cell, in order to keep the communication of the terminal uninterrupted, a cell handover is required. Since the system information set scheduled by different cells may be different, when the cell that the terminal accesses is switched, for example, from the first cell to the second cell, the terminal needs to determine the second system information set scheduled by the second cell. After determining the system information that the terminal is currently interested and/or not interested in receiving, the terminal reports to the second cell through the second interest information, thereby enabling the second cell to learn the system information that the terminal is interested and/or not interested in receiving.

Optionally, if the terminal is located in multiple cells, the interest information is separately indicated for different cells.

In an example, if the terminal is located in a third cell in addition to the first cell, the terminal determines a third system information set scheduled by the third cell, and the third system information set includes at least one piece of system information. Then, the terminal sends third interest information to the third base station, where the third interest information indicates system information that the terminal is interested in and/or not interested in receiving in the third system information set.

Figure 4:
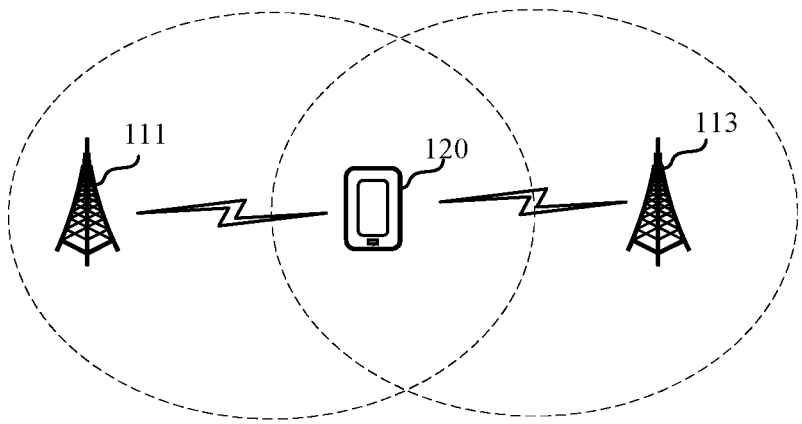
FIG. 4 exemplarily shows a schematic diagram of a terminal simultaneously located in a cell where one or more base stations are located.

The terminal may be located in one or more cells at the same time. For example, referring to FIG. 4, the terminal 120 may be located in the first cell 111 and the third cell 113. Since the system information sets scheduled by different cells may be different, the terminal can also determine the third system information set scheduled by the third cell, determine the system information that the terminal is interested and/or not interested in receiving in the third system information set, and reports it to the third cell through the third interest information.

To sum up, according to the technical solution provided by the embodiments of the disclosure, the terminal determines the system information set scheduled by the cell, and after entering the connected state, the terminal sends interest information to the cell for indicating the system information that the terminal is interested and/or not interested in receiving, thereby enabling the cell to transmit the system information that the terminal is interested in receiving. Compared with the related art in which the base station sends certain system information to the terminal even the terminal does not need to receive the system information, according to the disclosure, the base station sends the system information that the terminal is interested in receiving according to the interest information sent by the terminal, without sending system information that the terminal is not interested in receiving, thereby reducing useless signaling overhead.

In addition, the first interest information includes one-to-one corresponding bits with the system information. On the one hand, it can simply and clearly indicate to the base station the system information that the terminal is interested and/or not interested in. On the other hand, through the bitmap manner, the signaling load and power consumption of the terminal can be reduced.

In addition, when the terminal has the ability to report system information that it is interested and/or not interested in receiving, the terminal can report system information that it is interested and/or not interested in receiving to the cell. Correspondingly, the cell can transmit the system information that the terminal is interested in receiving, without transmitting the system information that the terminal is not interested in receiving, thereby improving the transmission efficiency and reducing the power consumption of the terminal.

Figure 5:
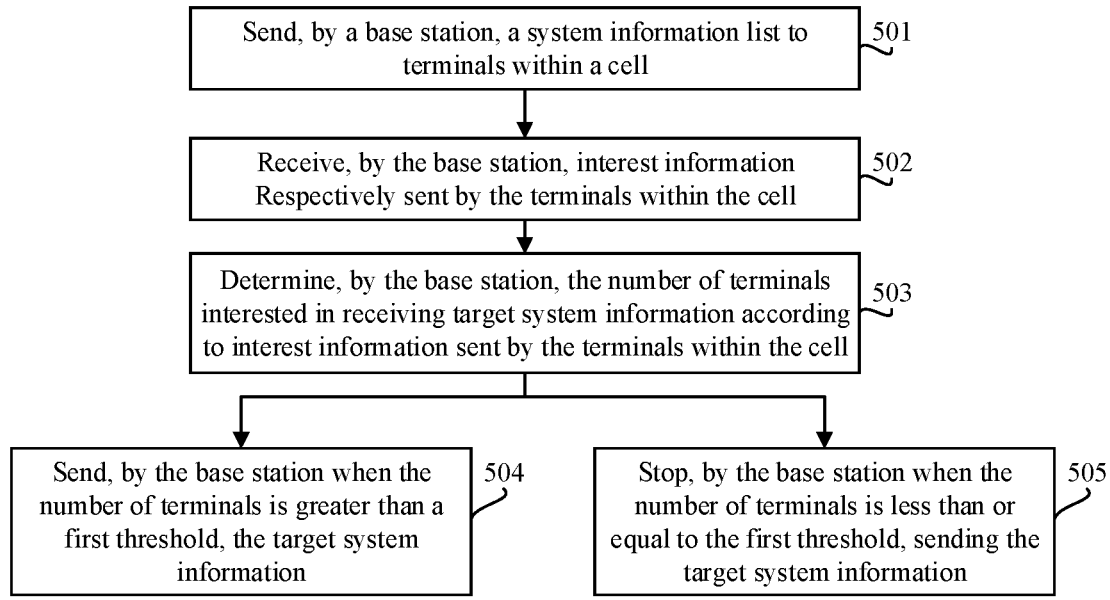
FIG. 5 is a flow chart showing a method for receiving information according to an exemplary embodiment.

FIG. 5 is a flow chart showing a method for receiving information according to an exemplary embodiment. This method can be applied to the base station shown in FIG. 1. The method can include the following steps (501-505).

In step 501, the base station sends a system information list to the terminals in the cell.

There can be multiple terminals in the cell where the base station is located. The base station can send the system information list to the terminals in the cell so that each terminal in the cell can determine the system information set scheduled by the base station according to the system information list, and further determine, at respective terminal, the system information that it is interested in receiving.

In step 502, the base station receives interest information respectively sent by the terminals in the cell.

Taking a target terminal in the cell as an example, the base station receives first interest information sent by the target terminal in the cell, and the first interest information indicates the system information that the target terminal is interested and/or not interested in receiving in the above system information list. The foregoing target terminal may be any terminal capable of reporting interest information in the cell where the base station is located.

In some embodiments, the base station may receive interest information respectively sent by all terminals in the cell, and may also receive interest information sent by some terminals in the cell. For example, when the terminal is capable of reporting interest information, it can send interest information to the base station.

In step 503, the base station determines the number of terminals interested in receiving target system information according to the interest information sent by the terminals in the cell.

The interest information sent by each terminal separately indicates the system information that each terminal is interested in and/or not interested in receiving. Therefore, the base station can determine the number of terminals interested in receiving the target system information based on the interest information sent by the terminals.

Exemplarily, three terminals in the cell where the base station is located respectively send interest information to the base station. For example, terminal A sends interest information a to the base station, terminal B sends interest information b to the base station, and terminal C sends interest information c to the base station. Information a indicates that terminal A is interested in receiving system information x, interest information b indicates that terminal B is interested in receiving system information y, and interest information c indicates that terminal C is interested in receiving system information x. Accordingly, the base station can determine that the number of terminals that are interested in receiving system information x is 2, including terminal A and terminal C.

In step 504, if the number of terminals is greater than a first threshold, the base station sends target system information.

Optionally, the base station may send the target system information to the terminals interested in receiving the target system information in the broadcast manner or through dedicated signaling.

The aforementioned base station sending target system information may include following steps. If the number of terminals is greater than the first threshold and less than a second threshold, the base station sends the target system information to terminals interested in receiving the target system information through dedicated signaling. If the number of terminals is greater than or equal to the second threshold, the base station sends the target system information by broadcasting. Herein, the second threshold is greater than the first threshold.

For example, assuming that the first threshold is 0 and the second threshold is 2, when the number of terminals interested in receiving the target system information is greater than 0, the base station can send the target system information. When the number of terminals interested in receiving the target system information is 1, since the number of terminals is small, in order to save signaling overhead, the base station can send the target system information to the terminal through dedicated signaling. When the number of terminals interested in receiving the target system information is greater than or equal to 2, the base station can send the target system information in the broadcast manner.

In addition, if the target system information is system information that the base station has not previously sent, when the number of terminals interested in receiving the target system information is 0, the base station can still send the target system information.

Optionally, the base station sends designated system information to the terminals in the cell, the designated system information includes interest report indication information, and the interest report indication information indicates whether the base station allows or supports the terminal to report the system information that the terminal is interested and/or not interested in receiving. Other details of this step have been described in detail in the embodiment of FIG. 3, and will not be repeated here.

Optionally, the base station sends an interest report request message to the target terminal, where the interest report request message indicates the target terminal to report system information that it is interested and/or not interested in receiving. That is, the base station may request or instruct the terminal to report the system information that it is interested and/or not interested in receiving, so that the base station can determine the system information that the terminal is interested in and/or not interested in receiving.

In addition, the base station may send an interest report request message to all or part of the terminals in the cell. After receiving the interest report request message, the terminal may report the interest information to the base station, or may not report the interest information to the base station. In some exemplary embodiments, the base station receives capability information sent by some terminals in the cell, and the capability information indicates whether the terminals have the ability to report system information that they are interested and/or not interested in receiving. If it is determined that the target terminal has the ability to report system information that it is interested and/or not interested in receiving, the base station sends the interest report request message to the target terminal to request the target terminal to report interest information to the base station.

Optionally, after receiving the first interest information, the base station sends an acknowledgement message corresponding to the first interest information to the target terminal to indicate to the target terminal that the base station successfully receives the first interest information sent by the target terminal. In some other embodiments, after the base station receives the first interest information, it may not send the acknowledgement message corresponding to the first interest information to the target terminal, which is not limited in the embodiments of the disclosure.

Optionally, taking the target terminal in the cell as an example, when the content of the first system information that the target terminal is interested in receiving changes, the base station sends the changed first system information to the target terminal. The change in the content of the first system information may be that the parameters carried in the first system information are changed, for example, a parameter of random access control information (RACH) in SIB 5 message is changed.

Every time the content of the target system information changes, there is no need for the terminal to send a system information request to the base station to request the base station to transmit the changed target system information, which not only saves signaling overhead and reduces power consumption of the terminal, but also avoids the problem of congestion when multiple terminals initiate system information requests at the same time.

Optionally, taking the target terminal in the cell as an example, if it is detected that the target terminal is handed over from the cell where the base station is located to another cell, the base station informs another base station in the another cell of the system information that the target terminal is interested and/or not interested in receiving.

When the target terminal is handed over from the cell where the base station is located to another cell, the system information set scheduled by different base stations may be different, so the base station can inform the another base station in the another cell of the system information that the target terminal is interested and/or not interested in receiving, so that the another base station in the another cell can deliver system information that the target terminal is interested in receiving. In addition, since the base station informs the another base station in the another cell, it is not necessary for the target terminal to reacquire the system information set scheduled by the another base station in the another cell and, then, report the system information that the target terminal is interested and/or not interested in receiving to the another base station in the another cell, thereby saving signaling overhead, as well as reducing power consumption of the terminal.

In addition, when the content of a certain system information changes in the system information set scheduled by the base station in the cell, the base station can re-determine the number of terminals interested in receiving the system information according to the interest information sent by the terminals in the current cell, and decide whether to send the system information according to the number of terminals. For example, when the number of terminals is greater than the first threshold, the base station sends the system information; when the number of terminals is less than or equal to the first threshold, the base station does not send the system information; when the number of terminals is greater than the first threshold and less than the second threshold, the base station sends the system information through dedicated signaling; and when the number of terminals is greater than or equal to the second threshold, the base station sends the system information in the broadcast manner. Herein, the second threshold is greater than the first threshold. In step 505, if the number of terminals mentioned above is less than or equal to the first threshold, the base station stops sending the target system information.

If the number of terminals mentioned above is less than or equal to the first threshold, the base station can stop sending the target system information in consideration of saving signaling. For example, when the number of terminals interested in receiving the target system information is 0, the base station stops sending the target system information.

In some other embodiments, the base station may also determine the number of terminals interested in receiving the target system information sent on a BWP according to the interest information sent by the terminals in the cell. If the number of terminals is greater than the first threshold, the base station sends the target system information on a target BWP. In the 5G NR system, a carrier bandwidth can be divided into multiple BWPs, the base station can configure multiple BWPs for the terminal at the same time and, accordingly, decide on which BWP or BWPs to send system information. However, the terminal may only have one active BWP on a carrier at the same time. If the terminal is configured with multiple carriers, then each carrier can have an activated BWP, and the terminal may only receive system information on the activated BWP.

In addition, if the number of terminals is greater than the first threshold and less than the second threshold, the base station sends the target system information to the terminals interested in receiving the target system information on the target BWP through dedicated signaling. If the number of terminals is greater than or equal to the second threshold, then the base station transmits the target system information in the broadcast manner. Herein, the second threshold is greater than the first threshold.

In summary, according to the technical solution provided by the embodiments of the disclosure, the base station sends the system information list to the terminals in the cell, and after receiving the interest information respectively sent by the terminals in the cell, the base station determines the number of terminals interested in receiving the target system information. When the number of terminals is greater than the first threshold, the base station sends the target system information. The base station can directly decide whether to send the target system information according to the number of terminals interested in receiving the target system information, without the network initiating paging, and without the terminal sending any system information request, thereby saving signaling overhead and reducing power consumption of the terminal.

In addition, every time the content of the target system information changes, there is no need for the terminal to send a system information request to the base station to request the base station to transmit the changed target system information, which not only saves signaling overhead and reduces power consumption of the terminal, but also avoids the problem of congestion when multiple terminals initiate system information requests at the same time.

It should be noted that in the above method embodiments, some content introduces the technical solutions of the present disclosure from the perspective of the interaction between the terminal and the base station. The above-mentioned steps performed at the terminal side can be individually implemented as an information sending method at the terminal side. The above-mentioned steps performed at the base station side can be individually implemented as an information receiving method at the base station side.

The following are device embodiments of the disclosure, which can be configured to implement the method embodiments of the present disclosure. For details that are not disclosed in the device embodiments of the disclosure, the method embodiments of the disclosure can be referred to.

Figure 6:
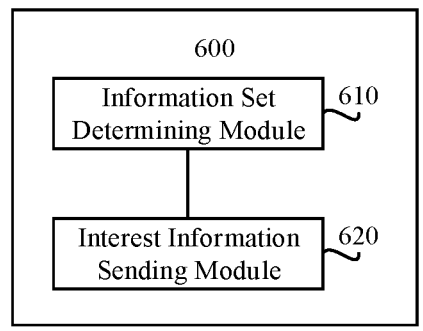
FIG. 6 is a block diagram showing an apparatus for sending information according to an exemplary embodiment.

FIG. 6 is a block diagram showing an apparatus for sending information according to an exemplary embodiment. The apparatus has the function of realizing the above-mentioned terminal-side method embodiments, and the function can be realized by hardware, or by hardware executing corresponding software. The apparatus can be the terminal described above, or it can be provided in the terminal. As shown in FIG. 6, the apparatus 600 includes an information set determining module 610 and an interest information sending module 620.

The information set determining module 610 is configured to determine a first system information set scheduled by a first cell, wherein the first system information set comprises n pieces of system information, where n is a positive integer.

The interest information sending module 620 is configured to send first interest information to the first cell, wherein the first interest information indicates, within the first system information set, system information that the terminal is interested in and/or not interested in receiving.

In summary, according to the technical solution provided by the embodiments of the disclosure, the base station sends the system information list to the terminal, thereby enabling the terminal to determine, from the system information list, the system information that it is interested and/or not interested in receiving. Subsequently, the terminal informs the base station of the system information that it is interested and/or not interested in receiving, thereby enabling the base station to send and/or not to send to the terminal the system information that it is interested in receiving. Compared with the related art in which the base station sends certain system information to the terminal even the terminal does not need to receive the system information, according to the disclosure, the base station sends the system information that the terminal is interested in receiving according to the interest information sent by the terminal, without sending system information that the terminal is not interested in receiving, thereby reducing useless signaling overhead.

In some exemplary embodiments, the first system information set includes system information received in a connected state.

In some exemplary embodiments, the first system information set includes system information to be received in the connected state and allowed to be requested in an On-demand manner.

In some exemplary embodiments, the first interest information includes n bits, and the n bits correspond to the n pieces of system information one-to-one; wherein an i-th bit of the n bits indicates whether the terminal is interested in receiving the i-th system information of the n pieces of system information, where i is a positive integer less than or equal to n.

In some exemplary embodiments, the interest information sending module 620 is configured to, after entering in the connected state, send the first interest information to the first cell.

Figure 7:
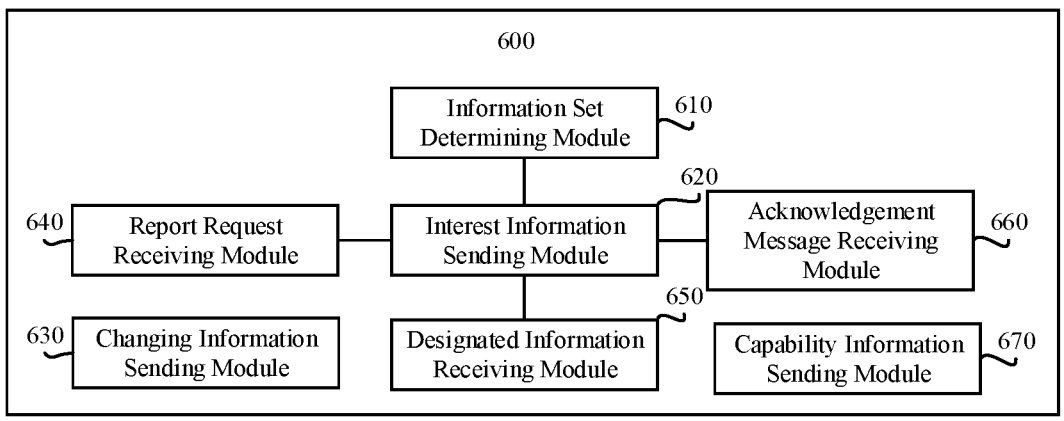
FIG. 7 is a block diagram showing an apparatus for sending information according to another exemplary embodiment.

In some exemplary embodiments, as shown in FIG. 7, the apparatus 600 further includes a change information sending module 630.

The change information sending module 630 is configured to send, when the terminal changes whether being interested in receiving system information in the first system information set, interest change information to the first cell, wherein the interest change information indicates changed system information that the terminal is interested in and/or not interested in receiving.

In some exemplary embodiments, as shown in FIG. 7, the apparatus 600 further includes a report request receiving module 640.

The report request receiving module 640 is configured to receive an interest report request message sent by the first cell, wherein the interest report request message indicates the terminal to report system information that the terminal is interested in and/or not interested in receiving.

The interest information sending module 620 is further configured to perform, after receiving the interest report request message, sending of the first interest information to the first cell.

In some exemplary embodiments, as shown in FIG. 7, the apparatus 600 further includes a designated information receiving module 650.

The designated information receiving module 650 is configured to receive designated system information, wherein the designated system information includes interest report indication information, and the interest report indication information indicates whether a network side allows or supports the terminal to report the system information that the terminal is interested in and/or not interested in receiving.

The interest information sending module 620 is further configured to perform, when the interest report indication information indicates that the network side allows or supports the terminal to report the system information that the terminal is interested in and/or not interested in receiving, sending of the first interest information to the first cell.

In some exemplary embodiments, as shown in FIG. 7, the apparatus 600 further includes an acknowledgement message receiving module 660.

The acknowledgement message receiving module 660 is configured to expect, after the first interest information is sent, to receive an acknowledgement message corresponding to the first interest information fed back by the first cell.

In some exemplary embodiments, as shown in FIG. 7, the apparatus 600 further includes a capability information sending module 670.

The capability information sending module 670 is configured to send capability information to the first cell, wherein the capability information indicates whether the terminal has an ability to report the system information that the terminal is interested in and/or not interested in receiving.

In some exemplary embodiments, the interest information is separately indicated for different cells.

In some exemplary embodiments, the information set determining module 610 is further configured to determine, when the terminal hands over from the first cell to a second cell, a second system information set scheduled by the second cell, wherein the second system information set includes at least one piece of system information.

The interest information sending module 620 is further configured to send second interest information to the second cell, wherein the second interest information indicates, within the second system information set, system information that the terminal is interested in and/or not interested in receiving.

Figure 8:
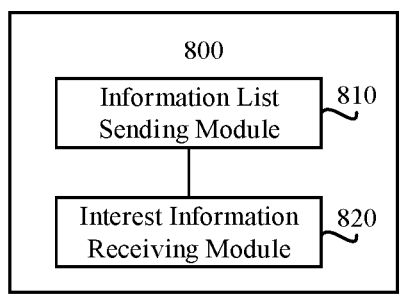
FIG. 8 is a block diagram showing an apparatus for receiving information according to an exemplary embodiment.

FIG. 8 is a block diagram showing an apparatus for receiving information according to an exemplary embodiment. The apparatus has the function of realizing the above method embodiments at the base station side, and the function can be realized by hardware, or by hardware executing corresponding software. The apparatus can be the base station described above, or it can be provided in the base station. As shown in FIG. 8, the apparatus 800 includes an information list sending module 810 and an interest information receiving module 820.

The information list sending module 810 is configured to send a system information list to terminals within a cell, wherein the system information list indicates a first system information set scheduled by the base station, and the first system information set includes n pieces of system information, where n is positive integer.

The interest information receiving module 820 is configured to receive first interest information sent by a target terminal within the cell, wherein the first interest information indicates, within the first system information set, system information that the target terminal is interested in and/or not interested in receiving.

In summary, according to the technical solution provided by the embodiments of the disclosure, the base station sends the system information list to the terminal, thereby enabling the terminal to determine, from the system information list, the system information that it is interested and/or not interested in receiving. Subsequently, the terminal informs the base station of the system information that it is interested and/or not interested in receiving, thereby enabling the base station to send and/or not to send to the terminal the system information that it is interested in receiving. Compared with the related art in which the base station sends certain system information to the terminal even the terminal does not need to receive the system information, according to the disclosure, the base station sends the system information that the terminal is interested in receiving according to the interest information sent by the terminal, without sending system information that the terminal is not interested in receiving, thereby reducing useless signaling overhead.

Figure 9:
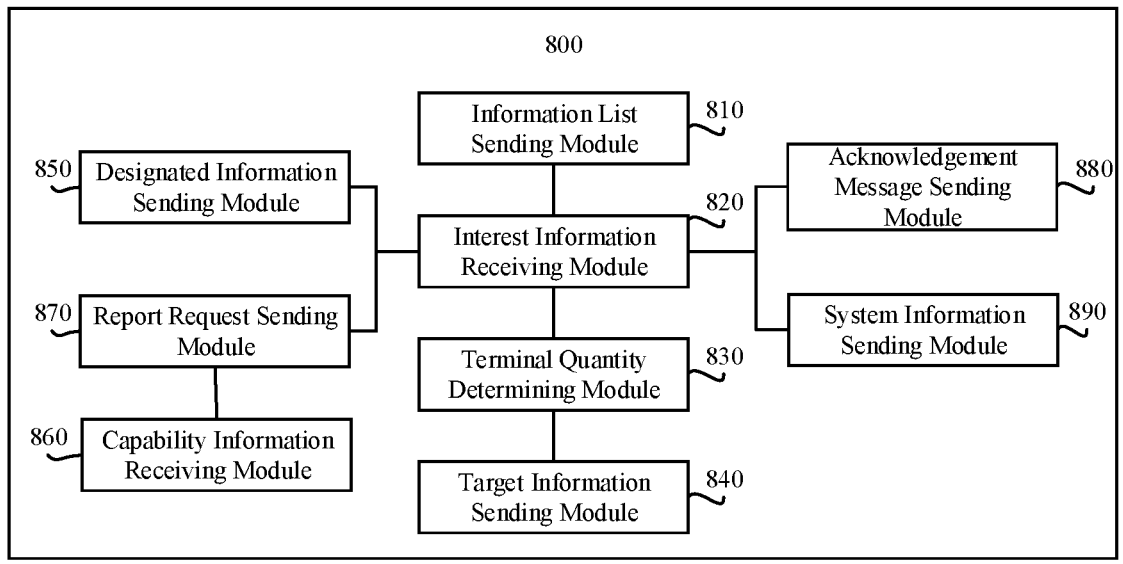
FIG. 9 is a block diagram showing an apparatus for receiving information according to another exemplary embodiment.

In some exemplary embodiments, as shown in FIG. 9, the apparatus 800 further includes: a terminal quantity determining module 830 and a target information sending module 840.

The terminal quantity determining module 830 is configured to determine the number of terminals interested in receiving target system information according to interest information sent by the terminals within the cell.

The target information sending module 840 is configured to send, when the number of terminals is greater than a first threshold, the target system information.

The target information sending module 840 is further configured to stop, when the number of terminals is less than or equal to the first threshold, sending the target system information.

In some exemplary embodiments, the target information sending module 840 is configured to:
  send, when the number of terminals is greater than the first threshold and less than a second threshold, the target system information to the terminals interested in receiving the target system information through dedicated signaling; and
  send, when the number of terminals is greater than or equal to the second threshold, the target system information in a broadcasting manner;
  wherein the second threshold is greater than the first threshold.

In some exemplary embodiments, the terminal quantity determining module 830 is further configured to determine, according to the interest information sent by the terminals within the cell, a number of terminals interested in receiving the target system information sent on a target BWP.

The target information sending module 840 is further configured to send, when the number of terminals is greater than the first threshold, the target system information on the target BWP.

In some exemplary embodiments, as shown in FIG. 9, the apparatus 800 further includes a designated information sending module 850.

The designated information sending module 850 is configured to send designated system information to the terminals within the cell, wherein the designated system information includes interest report indication information, and the interest report indication information indicates whether the base station allows or supports the terminals to report the system information that the terminals are interested in and/or not interested in receiving.

In some exemplary embodiments, as shown in FIG. 9, the apparatus 800 further includes a capability information receiving module 860 and a report request sending module 870.

The capability information receiving module 860 is configured to receive capability information sent by a terminal within the cell, wherein the capability information indicates whether the terminal has an ability to report system information that the terminal is interested in and/or not interested in receiving.

The report request sending module 870 is configured to determine, according to the capability information sent by the target terminal, the target terminal has the ability to report the system information that the target terminal is interested in and/or not interested in receiving; and send an interest report request message to the target terminal, wherein the interest report request message indicates the target terminal to report the system information that the target terminal is interested in and/or not interested in receiving.

In some exemplary embodiments, as shown in FIG. 9, the apparatus 800 further includes an acknowledgement message sending module 880.

The acknowledgement message sending module 880 is configured to send, after receiving the first interest information, an acknowledgement message corresponding to the first interest information to the target terminal.

In some exemplary embodiments, as shown in FIG. 9, the apparatus 800 further includes a system information sending module 890.

The system information sending module 890 is configured to send, when the target terminal is interested in receiving the first system information and content of the first system information changes, changed first system information to the target terminal.

In some exemplary embodiments, the system information sending module 890 is further configured to inform, when it is detected that the target terminal hands over from the cell where the base station is located to another cell, a base station in the another cell of the system information that the target terminal is interested in and/or not interested in receiving.

It should be noted that, when the apparatus provided in the above embodiments realizes its functions, the division of the above functional modules is only used for illustration. In actual applications, the above functions can be allocated by different functional modules according to actual needs. That is, the content structure of the apparatus may be divided into different functional modules to complete all or part of the functions described above.

Regarding the apparatus in the foregoing embodiments, the specific manner in which each module performs the operation has been described in detail in the method embodiments, and detailed description will not be given here.

Some exemplary embodiments of the disclosure also provide an information sending device, which can be applied to the terminal described above and can implement the information sending method provided by the disclosure. The device may include a processor, and a memory for storing executable instructions of the processor. In some embodiments, the processor is configured to:

determine a first system information set scheduled by a first cell, wherein the first system information set includes n pieces of system information, where n is a positive integer; and send first interest information to the first cell, wherein the first interest information indicates, within the first system information set, system information that the terminal is interested in and/or not interested in receiving.

In some exemplary embodiments, the processor is further configured to:

the first system information set includes system information to be received in a connected state.

In some exemplary embodiments, the processor is further configured to:

the first system information set includes system information to be received in a connected state and allowed to be requested in an On-demand manner.

In some exemplary embodiments, the processor is further configured to:

the first interest information includes n bits, and the n bits correspond to the n pieces of system information one-to-one; and wherein an i-th bit of the n bits indicates whether the terminal is interested in receiving the i-th system information of then pieces of system information, where i is a positive integer less than or equal to n.

In some exemplary embodiments, the processor is further configured to:

send, after entering a connected state, the first interest information to the first cell.

In some exemplary embodiments, the processor is further configured to:

send, when the terminal changes whether the terminal is interested in receiving system information in the first system information set, interest change information to the first cell, wherein the interest change information indicates, after the changing, system information that the terminal is interested in and/or not interested in receiving.

In some exemplary embodiments, the processor is further configured to:

receive an interest report request message sent by the first cell, wherein the interest report request message indicates the terminal to report system information that the terminal is interested in and/or not interested in receiving; and perform, after receiving the interest report request message, sending of the first interest information to the first cell.

In some exemplary embodiments, the processor is further configured to:

receive designated system information, wherein the designated system information includes interest report indication information, and the interest report indication information indicates whether a network side allows or supports the terminal to report the system information that the terminal is interested in and/or not interested in receiving; and perform, when the interest report indication information indicates that the network side allows or supports the terminal to report the system information that the terminal is interested in and/or not interested in receiving, sending of the first interest information to the first cell.

In some exemplary embodiments, the processor is further configured to:

expect, after sending the first interest information, to receive an acknowledgement message corresponding to the first interest information fed back by the first cell.

In some exemplary embodiments, the processor is further configured to:

send capability information to the first cell, wherein the capability information indicates whether the terminal has an ability to report the system information that the terminal is interested in and/or not interested in receiving.

In some exemplary embodiments, the interest information is separately indicated for different cells.

In some exemplary embodiments, the processor is further configured to:

determine, when handing over from the first cell to a second cell, a second system information set scheduled by the second cell, wherein the second system information set includes at least one piece of system information; and send second interest information to the second cell, wherein the second interest information indicates, within the second system information set, system information that the terminal is interested in and/or not interested in receiving.

Some exemplary embodiments of the disclosure also provide an information receiving device, which can be applied to the base station described above, and can implement the information receiving method provided by the disclosure. The device may include a processor, and a memory for storing executable instructions of the processor. In some embodiments, the processor is configured to:

send a system information list to terminals within a cell, wherein the system information list indicates a first system information set scheduled by the base station, and the first system information set includes n pieces of system information, where n is positive integer; and receive first interest information sent by a target terminal within the cell, wherein the first interest information indicates, within the first system information set, system information that the target terminal is interested in and/or not interested in receiving.

In some exemplary embodiments, the processor is further configured to:

determine the number of terminals interested in receiving target system information according to interest information sent by the terminals within the cell;

send, when the number of terminals is greater than a first threshold, the target system information; and stop, when the number of terminals is less than or equal to the first threshold, sending the target system information.

In some exemplary embodiments, the processor is further configured to:

send, when the number of terminals is greater than the first threshold and less than a second threshold, the target system information to the terminals interested in receiving the target system information through dedicated signaling; and send, when the number of terminals is greater than or equal to the second threshold, the target system information in a broadcasting manner;

wherein the second threshold is greater than the first threshold.

In some exemplary embodiments, the processor is further configured to:

determine, according to the interest information sent by the terminals within the cell, a number of terminals interested in receiving the target system information sent on a target BWP; and send, when the number of terminals is greater than a first threshold, the target system information on the target BWP.

In some exemplary embodiments, the processor is further configured to:

send designated system information to the terminals within the cell, wherein the designated system information includes interest report indication information, and the interest report indication information indicates whether the base station allows or supports the terminals to report the system information that the terminals are interested in and/or not interested in receiving.

In some exemplary embodiments, the processor is further configured to:

receive capability information sent by a terminal within the cell, wherein the capability information indicates whether the terminal has an ability to report system information that the terminal is interested in and/or not interested in receiving;

determine, according to the capability information sent by the target terminal, the target terminal has the ability to report the system information that the target terminal is interested in and/or not interested in receiving; and send an interest report request message to the target terminal, wherein the interest report request message indicates the target terminal to report the system information that the target terminal is interested in and/or not interested in receiving.

In some exemplary embodiments, the processor is further configured to:

send, after receiving the first interest information, an acknowledgement message corresponding to the first interest information to the target terminal.

In some exemplary embodiments, the processor is further configured to:

send, when the target terminal is interested in receiving the first system information and content of the first system information changes, changed first system information to the target terminal.

In some exemplary embodiments, the processor is further configured to:

inform, when detecting that the target terminal hands over from the cell where the base station is located to another cell, a base station in the another cell of the system information that the target terminal is interested in and/or not interested in receiving.

The foregoing mainly introduces the solutions provided by the embodiments of the disclosure from the perspectives of the terminal and the base station. It can be understood that, in order to realize the above-mentioned functions, the terminal and the base station include hardware structures and/or software modules corresponding to each function. In combination with the units and algorithm steps of the examples described in the embodiments disclosed in the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different manners for each specific application to implement the described functions, but such implementation should not be considered as going beyond the scope of the technical solutions of the embodiments of the disclosure.

Figure 10:
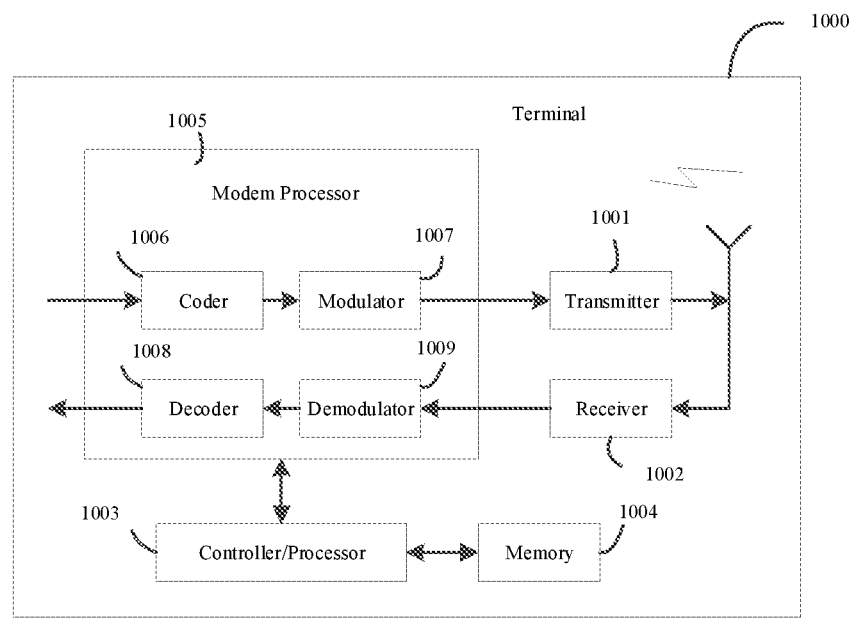
FIG. 10 is a schematic structural diagram showing a terminal according to an exemplary embodiment.

FIG. 10 is a schematic structural diagram showing a terminal according to an exemplary embodiment.

The terminal 1000 includes a transmitter 1001, a receiver 1002 and a processor 1003. The processor 1003 may also be a controller, which is represented as "controller/processor 1003" in FIG. 10. Optionally, the terminal 1000 may further include a modem processor 1005, where the modem processor 1005 may include an encoder 1006, a modulator 1007, a decoder 1008, and a demodulator 1009.

In some embodiments, the transmitter 1001 adjusts (e.g., through analog conversion, filtering, amplification, up-conversion, and the like) output samples and generates an uplink signal, which is transmitted to the base station via an antenna. On the downlink, the antenna receives the downlink signal transmitted by the base station. The receiver 1002 adjusts (e.g., through filtering, amplification, down-conversion, digitizing, and the like) the signal received from the antenna and provides input samples. In the modem processor 1005, the encoder 1006 receives service data and signaling messages to be transmitted on the uplink, and processes the service data and signaling messages (e.g., formatting, encoding, and interleaving). The modulator 1007 further processes (e.g., symbol mapping and modulation) the encoded service data and signaling messages and provides output samples. The demodulator 1009 processes (e.g., demodulates) the input samples and provides symbol estimates. The decoder 1008 processes (e.g., deinterleaves and decodes) the symbol estimation and provides decoded data and signaling messages sent to the terminal 1000. The encoder 1006, the modulator 1007, the demodulator 1009, and the decoder 1008 can be implemented by a synthesized modem processor 1005. These units perform processing according to radio access technology adopted by the radio access network (for example, 5G NR and access technologies of other evolved systems). It should be noted that when the terminal 1000 does not include the modem processor 1005, the aforementioned functions of the modem processor 1005 may also be performed by the processor 1003.

The processor 1003 controls and manages operations of the terminal 1000, and is configured to execute the processing procedure performed by the terminal 1000 in the foregoing embodiments of the disclosure. For example, the processor 1003 is further configured to execute each step at the terminal side in the foregoing method embodiments, and/or other steps of the technical solution described in the embodiments of the disclosure.

Further, the terminal 1000 may further include a memory 1004, and the memory 1004 is configured to store program codes and data for the terminal 1000.

It can be understood that FIG. 10 only shows a simplified design of the terminal 1000. In practical applications, the terminal 1000 may include any number of transmitters, receivers, processors, modem processors, memories, and the like, and all terminals that can implement the embodiments of the disclosure shall fall within the protection scope of the embodiments of the disclosure.

Figure 11:
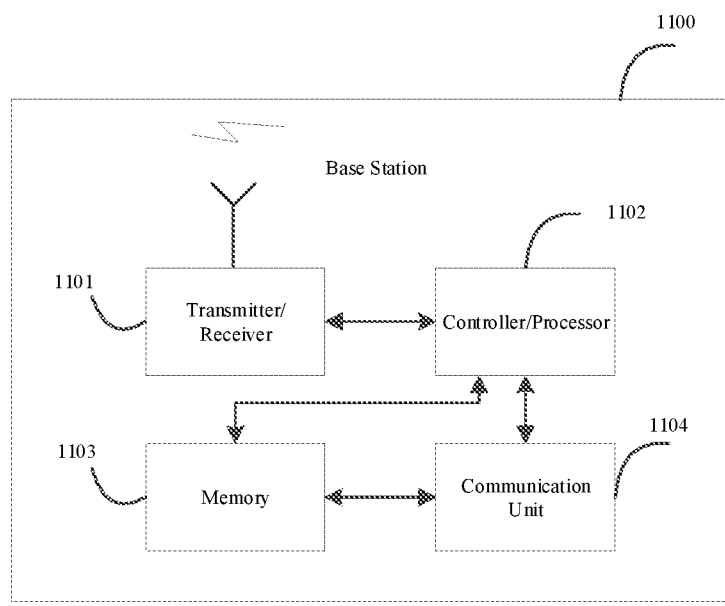
FIG. 11 is a schematic diagram showing the structure of a base station according to an exemplary embodiment.

FIG. 11 is a schematic diagram showing the structure of a base station according to an exemplary embodiment.

The base station 1100 includes a transmitter/receiver 1101 and a processor 1102. The processor 1102 may also be a controller, which is represented as "controller/processor 1102" in FIG. 11. The transmitter/receiver 1101 is configured to support the sending and receiving of information between the base station and the terminal in the foregoing embodiments, and to support communication between the base station and other network entities. The processor 1102 performs various functions for communicating with the terminal. Over the uplink, the uplink signal from the terminal is received via the antenna, demodulated by the receiver 1101 (e.g., demodulating the high-frequency signal into a baseband signal), and further processed by the processor 1102 to restore the service data and signaling information sent by the terminal. Over the downlink, service data and signaling messages are processed by the processor 1102, and modulated by the transmitter 1101 (e.g., the baseband signal is modulated into a high-frequency signal) to generate a downlink signal, which is transmitted to the terminal via an antenna. It should be noted that the above-mentioned demodulation or modulation function may also be performed by the processor 1102. For example, the processor 1102 is further configured to execute each step at the base station side in the foregoing method embodiments, and/or other steps of the technical solution described in the embodiments of the present disclosure.

Further, the base station 1100 may further include a memory 1103, and the memory 1103 is configured to store program codes and data of the base station 1100. In addition, the base station may also include a communication unit 1104. The communication unit 1104 is configured to support the base station to communicate with other network entities (e.g., network equipment in the core network and the like). For example, in the 5G NR system, the communication unit 1104 may be an NG-U interface, which is configured to support communication between the base station and the user plane function (UPF) entity. Alternatively, the communication unit 1104 may also be an NG-C interface configured to support access to access and mobility management function (AMF) entities for communication.

It can be understood that FIG. 11 only shows a simplified design of the base station 1100. In practical applications, the base station 1100 may include any number of transmitters, receivers, processors, controllers, memories, communication units, and the like, and all base stations that can implement the embodiments of the disclosure shall fall within the protection scope of the embodiments of the disclosure.

The embodiments of the disclosure also provide a non-transitory computer-readable storage medium on which a computer program is stored, and the computer program is executed by a processor of the terminal to implement the above-mentioned information sending method at the terminal side.

The embodiments of the disclosure also provide a non-transitory computer-readable storage medium on which a computer program is stored, and the computer program is executed by a processor of the base station to implement the above-mentioned information receiving method at the base station side.

It should be understood that the "plurality/multiple" mentioned herein refers to two or more. "And/or" describes an association relationship of associated objects, indicating that there can be three types of relationships, for example, A and/or B means A exists alone, A and B exist at the same time, and B exists alone. The character "/" generally indicates that the associated objects therebefore and thereafter are in an "or" relationship.

Those skilled in the art will easily think of other embodiments of the disclosure after considering the specification and practicing the disclosure disclosed herein. The disclosure is intended to cover any variations, uses, or adaptive changes of present disclosure, which comply with the general principles of the disclosure and include common knowledge or conventional technical means in the technical field not disclosed in the disclosure. The description and the embodiments are to be regarded as exemplary only, and the protection scope and spirit of the disclosure are to be defined by the following claims.

It should be understood that the disclosure is not limited to the precise structure that has been described above and shown in the drawings, and various modifications and changes can be made without departing from its scope. The protection scope of the disclosure is limited only by the appended claims.

What is claimed is:

1. A method for sending information, comprising:
determining, by a terminal, a first system information set scheduled by a first cell, wherein the first system information set comprises n pieces of system information, where n is a positive integer;
receiving, by the terminal, designated system information, wherein the designated system information comprises interest report indication information, and the interest report indication information indicates whether a network side allows or supports the terminal to report the system information that the terminal is interested in and/or not interested in receiving; and
sending, by the terminal in response to the interest report indication information indicating that the network side allows or supports the terminal to report the system information that the terminal is interested in and/or not interested in receiving, first interest information to the first cell, wherein the first interest information indicates, within the first system information set, system information that the terminal is interested in and/or not interested in receiving,
wherein the first cell is configured to stop sending target system information in response to a number of terminals interested in receiving the target system information being less than or equal to a first threshold, send the target system information through dedicated signaling in response to the number of terminals being greater than the first threshold and less than a second threshold, and send the target system information in a broadcasting manner in response to the number of terminals being greater than or equal to the second threshold, where the first and second thresholds are integers greater than 0, and the second threshold is greater than the first threshold; and
when the terminal indicates, through the first interest information, to the first cell that the terminal is interested in receiving first system information, and the terminal does not receive the first system information sent by the first cell, sending, by the terminal, a system information request to the first cell, wherein the system information is used for requesting the first cell to send the first system information and carries an identifier of the first system information.

2. The method according to claim 1, wherein the first interest information comprises n bits, and the n bits correspond to the n pieces of system information one-to-one; and
wherein an i-th bit of the n bits indicates whether the terminal is interested in receiving the i-th system information of the n pieces of system information, where i is a positive integer less than or equal to n.

3. The method according to claim 1, wherein the sending, by the terminal, the first interest information to the first cell comprises:

sending, by the terminal after entering a connected state, the first interest information to the first cell.

4. The method according to claim 1, further comprising:

sending, by the terminal when changing whether the terminal is interested in receiving system information in the first system information set, interest change information to the first cell, wherein the interest change information indicates, after the changing, system information that the terminal is interested in and/or not interested in receiving.

5. The method according to claim 1, further comprising:

expecting, by the terminal after sending the first interest information, to receive an acknowledgement message corresponding to the first interest information fed back by the first cell.

6. The method according to claim 1, further comprising:

sending, by the terminal, capability information to the first cell, wherein the capability information indicates whether the terminal has an ability to report the system information that the terminal is interested in and/or not interested in receiving.

7. The method according to claim 1, wherein the first interest information is separately indicated for different cells.

8. The method according to claim 1, further comprising:

determining, by the terminal when handing over from the first cell to a second cell, a second system information set scheduled by the second cell, wherein the second system information set comprises at least one piece of system information; and sending, by the terminal, second interest information to the second cell, wherein the second interest information indicates, within the second system information set, system information that the terminal is interested in and/or not interested in receiving.

9. A method for receiving information, comprising:

sending, by a base station, a system information list to terminals within a cell, wherein the system information list indicates a first system information set scheduled by the base station, and the first system information set comprises n pieces of system information, where n is positive integer;

sending, by the base station, designated system information to the terminals within the cell, wherein the designated system information comprises interest report indication information, and the interest report indication information indicates whether the base station allows or supports the terminals to report the system information that the terminals are interested in and/or not interested in receiving; and receiving, by the base station in response to the interest report indication information indicating that the network side allows or supports the terminal to report the system information that the terminal is interested in and/or not interested in receiving, first interest information sent by a target terminal within the cell, wherein the first interest information indicates, within the first system information set, system information that the target terminal is interested in and/or not interested in receiving, wherein the method further comprises:

determining, by the base station, a number of terminals interested in receiving target system information according to interest information sent by the terminals within the cell;

sending, by the base station in response to determining that the number of terminals is greater than or equal to a second threshold, the target system information in a broadcasting manner;

sending, by the base station in response to determining that the number of terminals is greater than a first threshold and less than the second threshold, the target system information through dedicated signaling;

stopping, by the base station in response to determining that the number of terminals is less than or equal to the first threshold, sending the target system information, wherein the first and second thresholds are integers greater than 0, and the second threshold is greater than the first threshold; and receiving, by the base station, a system information request from a terminal which indicates, through the first interest information, to the base station that the terminal is interested in receiving first system information but does not receive the first system information sent by the base station, wherein the system information is used for requesting the first cell to send the first system information and carries an identifier of the first system information.

10. The method according to claim 9, further comprising:

determining, by the base station according to the interest information sent by the terminals within the cell, a number of terminals interested in receiving the target system information sent on a target bandwidth part (BWP); and sending, by the base station in response to determining that the number of terminals is greater than a first threshold, the target system information on the target BWP.

11. The method according to claim 9, further comprising:

receiving, by the base station, capability information sent by a terminal within the cell, wherein the capability information indicates whether the terminal has an ability to report system information that the terminal is interested in and/or not interested in receiving;

determining, by the base station according to the capability information sent by the target terminal, the target terminal has the ability to report the system information that the target terminal is interested in and/or not interested in receiving; and sending, by the base station, an interest report request message to the target terminal, wherein the interest report request message indicates the target terminal to report the system information that the target terminal is interested in and/or not interested in receiving.

12. The method according to claim 9 further comprising:

sending, by the base station after receiving the first interest information, an acknowledgement message corresponding to the first interest information to the target terminal.

13. The method according to claim 9, further comprising:

sending, by the base station when the target terminal is interested in receiving the first system information and content of the first system information changes, changed first system information to the target terminal.

14. The method according to claim 9, further comprising:

informing, by the base station when detecting that the target terminal hands over from the cell where the base station is located to another cell, a base station in the another cell of the system information that the target terminal is interested in and/or not interested in receiving.

15. A terminal, comprising:
a processor; and
a memory configured to store instructions executable by the processor;
wherein the processor is configured to:
determine a first system information set scheduled by a first cell, wherein the first system information set comprises n pieces of system information, where n is a positive integer;
receive designated system information, wherein the designated system information comprises interest report indication information, and the interest report indication information indicates whether a network side allows or supports the terminal to report the system information that the terminal is interested in and/or not interested in receiving; and
send, in response to the interest report indication information indicating that the network side allows or supports the terminal to report the system information that the terminal is interested in and/or not interested in receiving, first interest information to the first cell, wherein the first interest information indicates, within the first system information set, system information that the terminal is interested in and/or not interested in receiving,
wherein the first cell is configured to stop sending target system information in response to a number of terminals interested in receiving the target system information being less than or equal to a first threshold, send the target system information through dedicated signaling in response to the number of terminals being greater than the first threshold and less than a second threshold, and send the target system information in a broadcasting manner in response to the number of terminals being greater than or equal to the second threshold, wherein the first and second thresholds are integers greater than 0, and the second threshold is greater than the first threshold; and
when the terminal indicates, through the first interest information, to the first cell that the terminal is interested in receiving first system information, and the terminal does not receive the first system information sent by the first cell, the processor is further configured to send a system information request to the first cell, wherein the system information is used for requesting the first cell to send the first system information and carries an identifier of the first system information.

* * * * *